March 1, 1949.　　　　R. J. HARKER　　　　2,462,962
BLADE VIBRATION ABSORBER
Filed Sept. 26, 1945　　　　　　　　　　2 Sheets-Sheet 1
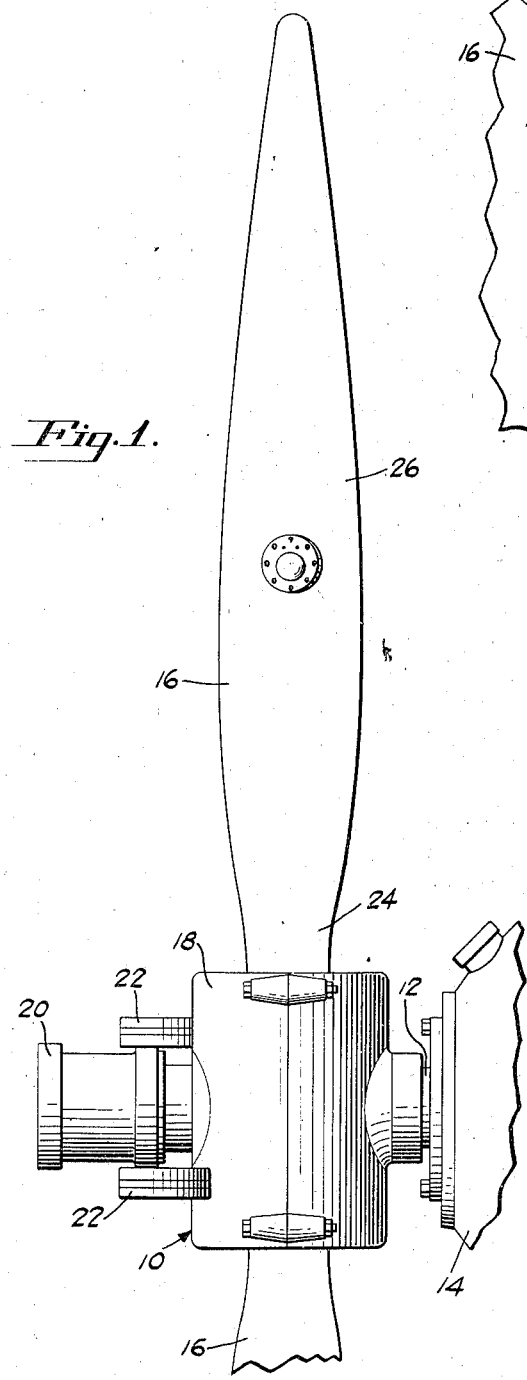
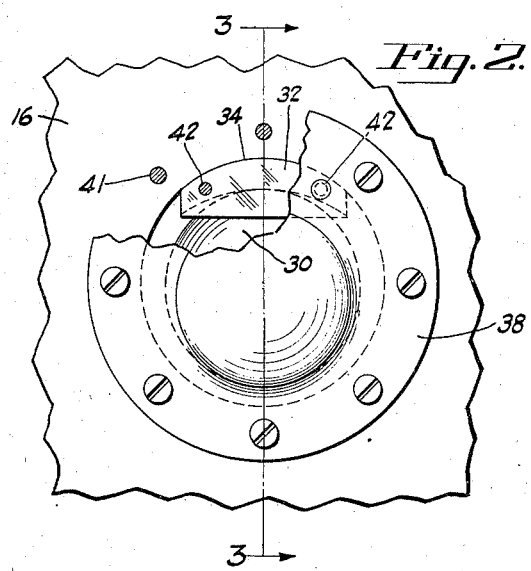
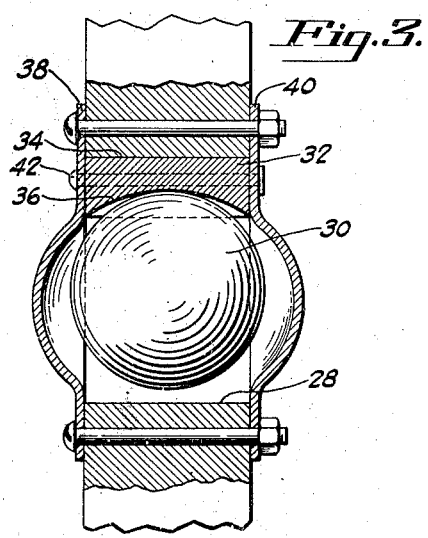
INVENTOR
*Ralph J. Harker.*
BY *Harris G. Luther*
ATTORNEY March 1, 1949. R. J. HARKER 2,462,962
BLADE VIBRATION ABSORBER
Filed Sept. 26, 1945 2 Sheets-Sheet 2
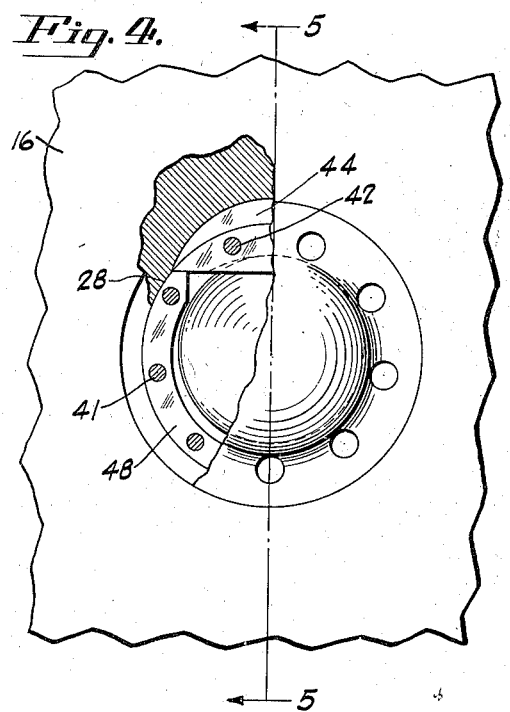
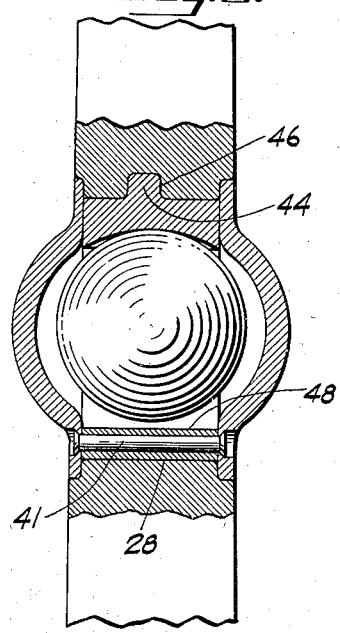
INVENTOR
*Ralph J. Harker.*
BY *Harris G. Luther*
ATTORNEY Patented Mar. 1, 1949

2,462,962

UNITED STATES PATENT OFFICE 2,462,962

BLADE VIBRATION ABSORBER

Ralph J. Harker, Glastonbury, Conn., assignor to United Aircraft Corporation, East Hartford, Conn., a corporation of Delaware Application September 26, 1945, Serial No. 618,693

9 Claims. (Cl. 170—159)

This invention relates to improvements in aeronautical propellers and particularly to improved means for providing a propeller vibration damping force.

An object of the invention resides in an improved construction for providing the required force in a rotating propeller blade.

Further and other objects and advantages will be apparent in the specification and claims and from the drawings which illustrate what is now considered to be a preferred embodiment of the invention.

In the drawings:

Fig. 1 is a side elevation of a propeller, with one blade broken away, showing the vibration absorber incorporated in the remaining propeller blade;

Fig. 2 is an enlarged view, with a portion broken away, showing the absorber and its mounting;

Fig. 3 is a section on lines 3—3 of Fig. 2.

Fig. 4 is a view similar to Fig. 2 but showing a modification; and

Fig. 5 is a section on lines 5—5 of Fig. 4.

In the drawings, a controllable pitch propeller, generally indicated at 10, is shown as mounted on a shaft 12 driven by an engine 14. The propeller comprises blades 16, preferably metal, rotatably mounted for pitch adjusting movement in a hub 18. A hydraulic piston 20 acting through counterweights 22 moves the blades about an axis extending longitudinally of the blade to control the blade pitch. The form of propeller and pitch controlling means illustrated is more particularly illustrated and described in U. S. Patent No. 2,032,255 for Propellers, issued February 25, 1936, to Frank W. Caldwell, to which reference may be had for further details.

In the modification disclosed, which is an improvement on the device disclosed in my U. S. application Serial No. 574,280, filed January 24, 1945, for Propeller blade vibration absorber, the metal blade 16, which has a shank portion 24 and a blade portion 26, is pierced in the blade portion to provide an aperture 28. This aperture extends between the face and camber portions of the blade and substantially normal to the face portion. The aperture is shown as cylindrical but may take any other desired shape.

A sphere 30 of hardened steel, or some other wear resisting relatively heavy material, is materially smaller than the aperture, and is supported for free movement within the aperture.

A seat 32, preferably of hardened steel is supported in the aperture, for guiding sphere 30 in its vibration absorbing movements. One face 34 of seat 32 is shaped to conform to the shape of the aperture, and a spherical depression 36 which acts as the guide or seat for sphere 30 is formed in the opposite face. Spherical depression 36 has a materially larger radius than the radius of sphere 30. By suitably proportioning the relative sizes of the seat and the sphere, the device may be proportioned to damp a selected order of vibration.

Seat 32 is retained in position transversely of the blade by plates 38 and 40 secured to the blade surfaces by screws or rivets 41 and covering the aperture. Pins 42 extending through the plates 38 and 40 and seat 32 serve to hold the seat in position in the aperture. Plates 38 and 40, in the modifications shown, are outwardly dished to provide clearance for sphere 30 so that it may freely oscillate under the influence of vibration induced forces.

Centrifugal forces induced by rotation of the propeller acting on sphere 30 tend to maintain it in a central position on seat 32. By placing the sphere at a considerable distance from the axis of rotation, the centrifugal and the damping forces are materially increased over the forces induced in the same size sphere nearer the axis of rotation for the same revolutions per minute. Thus, by locating the sphere in the blade portion, it is possible to obtain the required damping force from a smaller sphere.

The radial location of the absorber is determined by the vibratory mode, shape or deflection curve of the blade. In addition to being at as large a rotational radius as practicable, it should be placed at a point which has a large transverse vibratory motion, that is at a point of maximum transverse movement between two adjacent nodes.

In the modification shown in Figs. 4 and 5, the cover plates 38 and 40 are set into recesses in the respective faces of the blade and are blended into the blade surface and made flush except for the actual dish or bubble in the cover plates. The seat 32 has a key 44 on its convex side which seats in a keyway 46 cut in the interior of the blade. A U-shaped member 48 within the aperture 28 holds the seat 32 in position and is provided with holes to receive the rivets 41. In this construction it is necessary to make only one hole through the blade, the rivet holes being provided in the ring insert.

Once the design has been determined, that design will provide an absorber tuned to any selected number of vibrations per revolution of the propeller, which is commonly known as a vibration order, and the absorber will remain tuned to that order irrespective of the speed of rotation. Since the ball rides in a spherical race, the absorber can operate satisfactorily regardless of the rotation of the blades by the pitch changing mechanism. In order to provide for this contingency, the axis about which the blade changes its pitch preferably passes through substantially the center of the spherical race.

It is to be understood that the invention is not limited to the specific embodiment herein illustrated and described, but may be used in other ways without departure from its spirit as defined by the following claims.

I claim:

1. An aeronautical propeller blade adapted to be rotated about an axis and having a shank portion and a blade portion and having a transversely extending aperture in the blade portion, a tuned vibration absorber in said aperture comprising a sphere freely movable on a seat in said aperture, a curved concave seat for said sphere secured in said aperture with the concave portion facing the shank portion of said blade, said curved concave seat having a minimum radius greater than the radius of said sphere and a maximum radius less than the radius of rotation of said seat about said axis and means for retaining said sphere within said aperture.

2. In an aeronautical propeller blade rotatable about an axis and having a shank portion and a blade portion and having a transversely extending aperture in the blade portion, a tuned vibration absorber in said aperture comprising a sphere freely movable in said aperture, an insert having one face conformed to the shape of said aperture and a curved concave sphere supporting surface formed on the opposite face, said curved concave surface having a minimum radius greater than the radius of said sphere and a maximum radius less than the radius of rotation of said surface about said axis and means for retaining said insert in said aperture with the sphere supporting surface facing the shank portion of the blade.

3. In an aeronautical propeller blade rotatable about an axis and having a shank portion and a blade portion and having a substantially cylindrical aperture extending transversely through the blade portion with its axis substantially normal to the face portion of the blade, a tuned vibration absorber in said aperture comprising a sphere freely movable in said aperture and a curved concave seat for said sphere secured in said aperture with the concave portion facing the shank portion of said blade, the minimum radius of curvature of said curved concave seat being greater than the radius of said sphere and the maximum radius of said seat being less than the radius of rotation of said seat about said axis and means for retaining said sphere in said aperture.

4. A device as claimed in claim 1 in which the retaining means comprises plates secured to opposite sides of said blade and extending over said aperture.

5. A device as claimed in claim 1 in which the means for retaining said sphere in said aperture comprises plates secured to opposite sides of said blade completely enclosing said aperture and said sphere.

6. A device as claimed in claim 2 in which the means for retaining said seat in position comprises plates secured to opposite sides of said blades.

7. A metal aeronautical propeller blade rotatable about an axis and having a shank portion and a blade portion and having an aperture extending transversely through the blade portion, a tuned vibration absorber in said aperture comprising a hardened steel ball freely movable in said aperture and a hardened concave spherical seat of a larger radius than said sphere secured in said aperture and positioned to support said sphere against the action of centrifugal force, means for fixing said seat in position in said aperture at a distance from said axis greater than the radius of said seat, and means for retaining said sphere in said aperture.

8. In an aeronautical propeller blade having a shank portion and a blade portion and having a transversely extending aperture in the blade portion, a tuned vibration absorber in said aperture comprising a sphere freely movable in said aperture, an insert having a concave seat for said sphere, keyed in said aperture with the concave portion facing the shank portion of said blade, a U-shaped member seated in said aperture and abutting said insert, cover plates recessed into opposite faces of said blade, fastening means connecting said cover plates and said seat, and fastening means connecting said cover plates and said U-shaped member.

9. An aeronautical propeller blade having a shank portion and a blade portion and adapted to be mounted in a propeller hub for rotation about an axis and when so mounted having a vibratory deflection curve with nodes and maximum deflection between said nodes, said blade also having an aperture extending transversely through said blade portion substantially normal to the face portion of the blade and substantially at the portion of maximum deflection between two nodes, a vibration absorber in said aperture tuned to a preselected vibration order comprising a sphere freely movable in said aperture and a curved concave seat for the said sphere of greater radius than said sphere but of less radius than the radius of rotation of said seat about said axis and secured in said aperture with the concave portion facing the shank portion and means for retaining said sphere in said aperture.

RALPH J. HARKER.

REFERENCES CITED

The following references are of record in the file of this patent:

UNITED STATES PATENTS

| Number | Name | Date |
|---|---|---|
| 1,833,751 | Kimball | Nov. 24, 1931 |
| 1,856,786 | Rice | May 3, 1932 |
| 2,340,133 | Martin | Jan. 25, 1944 |
| 2,349,187 | Meyer | May 16, 1944 |
| 2,405,283 | Birmann | Aug. 6, 1946 |

FOREIGN PATENTS

| Number | Country | Date |
|---|---|---|
| 710,766 | France | June 9, 1931 |